United States Patent
Sundaresan et al.

(10) Patent No.: US 7,856,004 B2
(45) Date of Patent: Dec. 21, 2010

(54) METHOD FOR SCHEDULING HETEROGENEOUS TRAFFIC IN B3G/4G CELLULAR NETWORKS WITH MULTIPLE CHANNELS

(75) Inventors: Karthikeyan Sundaresan, Monmouth Junction, NJ (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 369 days.

(21) Appl. No.: 12/037,227

(22) Filed: Feb. 26, 2008

(65) Prior Publication Data
US 2008/0219145 A1 Sep. 11, 2008

Related U.S. Application Data

(60) Provisional application No. 60/893,719, filed on Mar. 8, 2007.

(51) Int. Cl.
*H04W 4/00* (2009.01)
(52) U.S. Cl. .................... 370/341; 370/203; 370/252

(58) Field of Classification Search ......... 370/203–208, 370/229–235, 241–253, 328–338, 341, 347, 370/442
See application file for complete search history.

(56) References Cited

U.S. PATENT DOCUMENTS
2006/0242319 A1* 10/2006 Sang et al. .................. 709/240
* cited by examiner

*Primary Examiner*—Ricky Ngo
*Assistant Examiner*—Kan Yuen
(74) *Attorney, Agent, or Firm*—Joseph Kolodka (57) ABSTRACT

A method includes tracking average user throughput, packet delay and jitter for every user that is serviced in an OFDM cellular system; using feedback to determine a potential schedule set responsive to user requirements for data and voice traffic responsive to minimum rate guarantee for data flows, and maximum tolerable delay and jitter guarantees for voice flows; with multiple flows for each user, first determining contending flow for each user responsive to aggregate rate feedback; obtaining search space for the user requirements of rate, delay and jitter responsive to corresponding optimizing strategies; determining individual rate, delay and jitter related schedules providing maximum incremental or marginal utility; and calculating final schedule of users on channels providing maximum incremental or marginal utility among parameter specific schedules form the determining step.

22 Claims, 5 Drawing Sheets

METHOD FOR SCHEDULING HETEROGENEOUS TRAFFIC IN B3G/4G CELLULAR NETWORKS WITH MULTIPLE CHANNELS

This application claims the benefit of U.S. Provisional Application No. 60/893,719, entitled "Scheduler Design for Heterogeneous Traffic in B3G/4G Cellular Networks with Multiple Channels", filed on Mar. 8, 2007, the contents of which is incorporated by reference herein.

BACKGROUND OF THE INVENTION

The present invention relates generally to wireless communications, and more particularly, to scheduling heterogeneous traffic in B3G/4G cellular networks with multiple channels.

Given the popularity and adoption of media applications, cellular networks are marching towards B3G/4G networks with the promise of providing high data rates and the ability to support such a multitude of applications. Further, one of the main goals of the long-term evolution (LTE) project of these cellular systems is the convergence towards an all-IP network, where all applications are envisioned to be carried over IP. Given these objectives, cellular networks must be tailored to efficiently carry not just data traffic, but also a wide variety of heterogeneous traffic such as data, VoIP, streaming applications, etc. One of the key design elements in such an endeavor is the base station traffic scheduler.

While there have been several works that have designed schedulers for individual traffic types and traffic parameters, they cannot be used for optimizing multiple traffic types in parallel. There have been some works that design schedulers for data and voice applications by providing strict priority for one over the other. Hence, they do not have the ability to flexibly trade-off resources between the different traffic types, which in turn is essential for traffic flows that belong to different quality if service QoS classes. Hence, the design of an efficient scheduler that handles heterogeneous traffic types in tandem along with the ability to flexibly allocate resources between them deserves significant attention.

Orthogonal Frequency Division Multiplexing (OFDM) is the desired air interface technology for B3G/4G cellular systems. There have been works that have proposed resource allocation strategies for assigning users and data to the multiple OFDM sub-channels. However, they focus only on rate and do not consider heterogeneous traffic parameters like rate, delay, jitter, etc. Further, they also do not focus on the complexity or communication overhead of the mechanisms. Hence, the design of a low complexity, low overhead, high performance scheduler capable of handling heterogeneous (data and voice) traffic in OFDM cellular systems, forms the topic of this invention.

Accordingly, there is a need for a low complexity, low overhead, high performance scheduler capable of handling heterogeneous (data and voice) traffic in OFDM cellular systems.

SUMMARY OF THE INVENTION

In accordance with the invention, a method includes tracking average user throughput, packet delay and jitter for every user that is serviced in an OFDM cellular system; using feedback to determine a potential schedule set responsive to user requirements for data and voice traffic responsive to minimum rate guarantee for data flows, and maximum tolerable delay and jitter guarantees for voice flows; with multiple flows for each user, first determining contending flow for each user responsive to aggregate rate feedback; obtaining search space for the user requirements of rate, delay and jitter responsive to corresponding optimizing strategies; determining individual rate, delay and jitter related schedules providing maximum incremental or marginal utility; and calculating final schedule of users on channels providing maximum incremental or marginal utility among parameter specific schedules form the determining step.

In accordance with another aspect of the invention, an apparatus includes means for tracking average user throughput, packet delay and jitter for every user that is serviced in an OFDM cellular system; means for using feedback to determine a potential schedule set responsive to user requirements for data and voice traffic responsive to minimum rate guarantee for data flows, and maximum tolerable delay and jitter guarantees for voice flows; with multiple flows for each user, means for first determining contending flow for each user responsive to aggregate rate feedback; means for obtaining search space for the user requirements of rate, delay and jitter responsive to corresponding optimizing strategies; means for determining individual rate, delay and jitter related schedules providing maximum incremental or marginal utility; and means for calculating final schedule of users on channels providing maximum incremental or marginal utility among parameter specific schedules form the means for determining.

BRIEF DESCRIPTION OF DRAWINGS

These and other advantages of the invention will be apparent to those of ordinary skill in the art by reference to the following detailed description and the accompanying drawings.

DETAILED DESCRIPTION

The inventive unified scheduling process runs at the base station and performs the task of deciding the set of users that will transmit in any given time slot, along with their corresponding resource allocation. It has a number of specific advantages and functionalities.

The inventive scheduling process provides a unified framework for optimally handling heterogeneous traffic types and parameters. The unified scheduling process optimizes the traffic parameters of rate, packet delay and packet jitter in tandem. It can be used with data, voice and streaming applications and also with other applications that require optimization of rate, delay and/or jitter parameters.

The scheduling process provides the flexibility to allocate resources between the different traffic types. This makes it applicable to the differentiated services (QoS) mechanisms in the Internet, whereby different traffic types belonging to different QoS classes can be appropriately and dynamically allocated resources.

The unified scheduling process provides optimal performance. However, in the context of multiple orthogonal frequency division multiplexing OFDM sub-channels, the complexity to achieve optimal performance increases exponentially. To address this, a new parameter-based optimization approach is adopted to propose a lower complexity, lower overhead (LCO) version of the scheduling process for OFDM systems.

The LCO version of the scheduling process incurs a complexity that is an order of $N^N$ lesser than that of the optimal scheme, where N is the number of antennas at both the base station and the mobile stations. This reduction in complexity makes it possible to run the process every frame, which is the granularity of scheduling decisions at the base station.

The communication overhead, in the form of feedback from the mobile stations is also reduced almost by an order of N, when compared to the optimal scheme. This will free up additional bandwidth resources for useful communication on the uplink.

The price to pay for the reduction in complexity and overhead is the sub-optimal performance with respect to the optimal unified scheduling process. However, the design keeps the deviation from the optimal process to only about 20%, thereby providing significantly good performance.

The solution is applicable to both the downlink as well as the uplink. These specific attributes of the proposed solution make it a good candidate for an efficient, low complexity-overhead, high performance scheduling process for carrying heterogeneous traffic over OFDM in B3G/4G cellular systems.

Figure 1A:
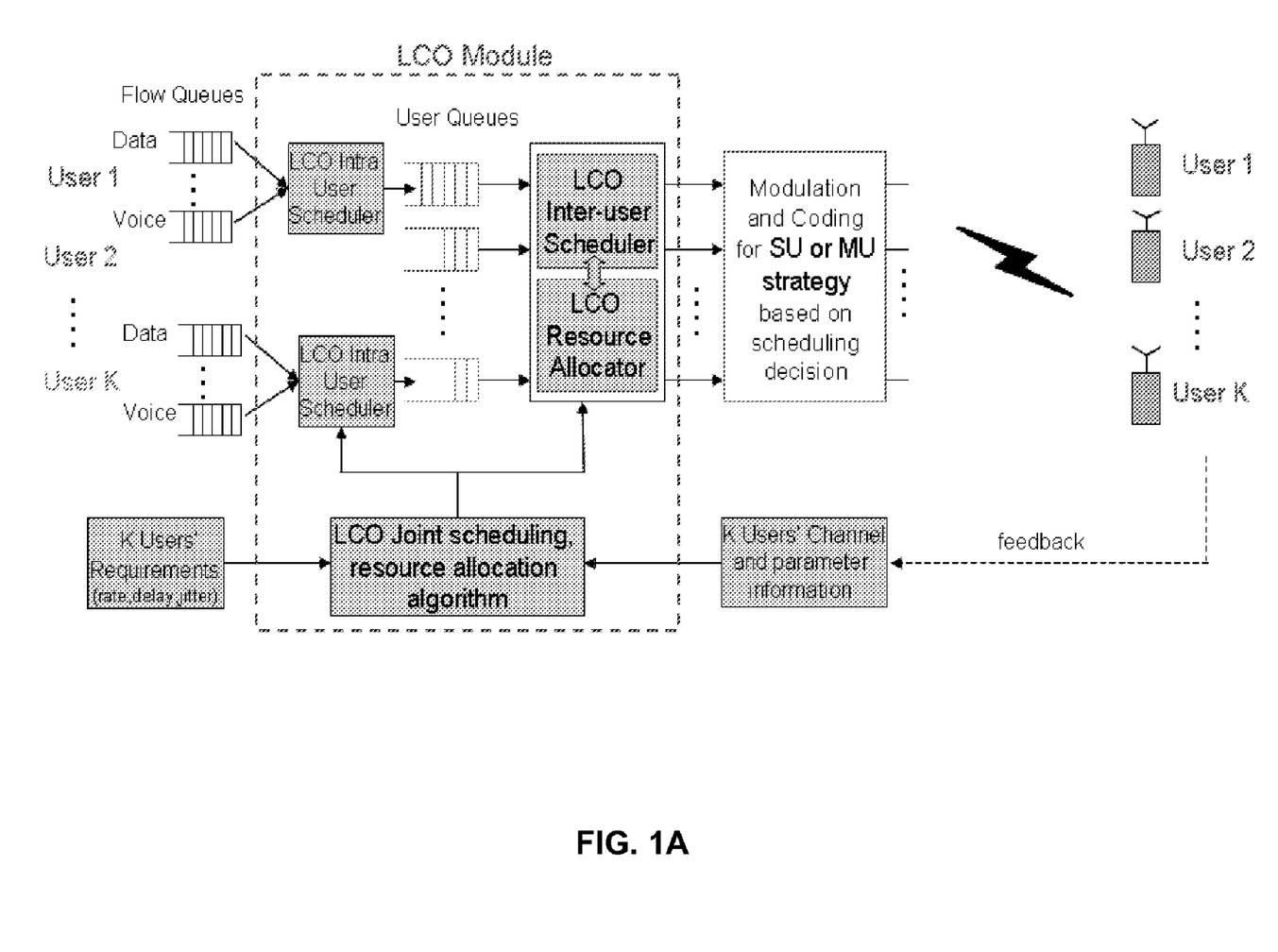
FIG. 1A is an exemplary system block diagram employing a low-complexity overhead LCO scheduler in accordance with the invention.

Referring to the system block diagram of FIG. 1A, there is shown an exemplary block diagram employing the inventive low-complexity overhead scheduler in accordance with the invention. Data and voice information from users, User 1, User 2 . . . User K, pass through flow queues into a low complexity-overhead LCO module. The data and voice information is received into a low complexity-overhead LCO intra user scheduler for each user and low-complexity-overhead resource allocator. Each K Users' requirements such as rate, delay and jitter are passed into the LCO module and received into a joint scheduling resource allocation algorithm that feeds both the LCO intra user scheduler and LCO inter-user scheduler and LCO resource allocator. Output from the LCO inter-user scheduler and LCO resource allocator are received into a process for modulation and coding for single user SU or multi-user MU strategy based on scheduling decision. Feedback from wireless users is processed as K Users' channel and parameter information, which is fed back into the LCO module's joint scheduling and resource allocation algorithm.

Figure 1B:
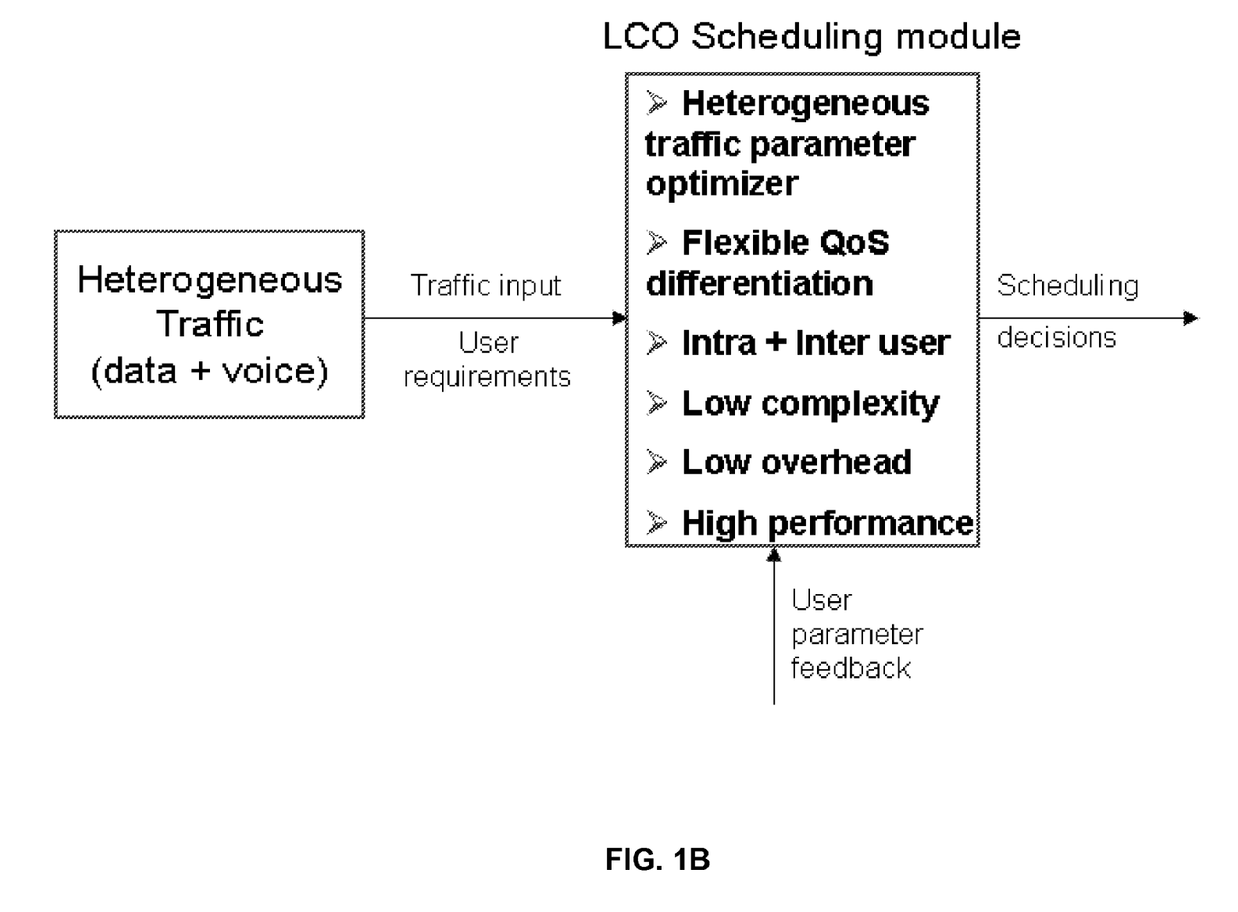
FIG. 1B details the inventive low complexity-overhead LCO scheduling functionalities.

Referring to the diagram of FIG. 1B, the LCO scheduling module functionalities are detailed. The heterogeneous voice and data traffic received into the LCO scheduling module which provides heterogeneous traffic parameter optimization, flexible QoS differentiation, intra and inter user scheduling, low complexity, low overhead and high performance capabilities.

The LCO (low complexity-overhead) scheduler resides in the base station and includes two components, the intra-user and inter-user scheduling components. The intra-user and inter-user components are fed by the low complexity-overhead LCO joint scheduling and resource allocation process.

The basis for the LCO scheduling process is an inventive unified optimal scheduling process, which is given by the following two-step scheduling rule:

Step 1: Intra-user scheduling rule $$f_k^* = \mathrm{argmax}_f \{\alpha_f (\Delta U)_{k,f}\}$$

Step 2: Inter-user scheduling rule $$S_{max} = \mathrm{argmax}_S \left\{ \sum_{k \in S} \beta_k \alpha_k^* \frac{r_k}{L_k P_k} \sum_{i=1}^{P_k} U_k(p_i)'(\delta p_i) \right\}$$

Since the base station has only one queue per user, the first scheduling rule identifies the specific flow from each user that will contend for the time slot. This happens at the network layer. The second scheduling rule then identifies the set of users (flows from the first step) that will actually transmit in the given slot based on available resources. The rules use concave utility functions (U) for flows as a common means of representing the application (end-user) utility obtained for a given resource allocation leading to different parameter (rate/delay/jitter) values.

Notation: U—utility function, f—flow index, k—user index, α—traffic type priority, β—user QoS class priority, p—parameter (rate/delay/jitter), r—instantaneous rate, L—packet size, P—number of parameters, S—potential schedule search space In the case of orthogonal frequency division multiplexing OFDM, the schedule search space S becomes exponential. To reduce the complexity and overhead, while retaining a performance close to the optimal scheme, LCO uses the following approach:

a) It does not optimize all parameters in parallel. It identifies the single parameter that will bring the maximum net incremental utility and optimizes that specific parameter in each slot.

b) It shifts between parameters from one slot to another depending on which parameter provides the maximum net incremental utility.

c) Since a single parameter is optimized, it is sub-optimal in performance. On the other hand this is exploited to reduce complexity and overhead.

d) Specific communication strategies that optimize individual parameters are identified and used for communication. Since parameter-specific optimization is performance, these identified strategies contribute to significantly reduced search space for potential schedules as well as reduced communication overhead.

e) Specifically, single-user (SU) transmission strategy (using all N sub-channels) is identified to be the optimizing strategy for packet delay, while multi-user (MU) strategy with N (out of K) distinct users transmitting in the slot is identified to be the optimizing strategy for rate and jitter.

f) Since only one channel per user is used in multi-user strategies, the complexity and overhead is further simplified by allowing the mobile stations (MS) to identify and feedback their best sub-channel index and the associated rate.

g) Further, since parameter-optimizing communication strategies are used in each slot, the deviation from the optimum kept small, while having reduced complexity and feedback overhead.

Figure 2:
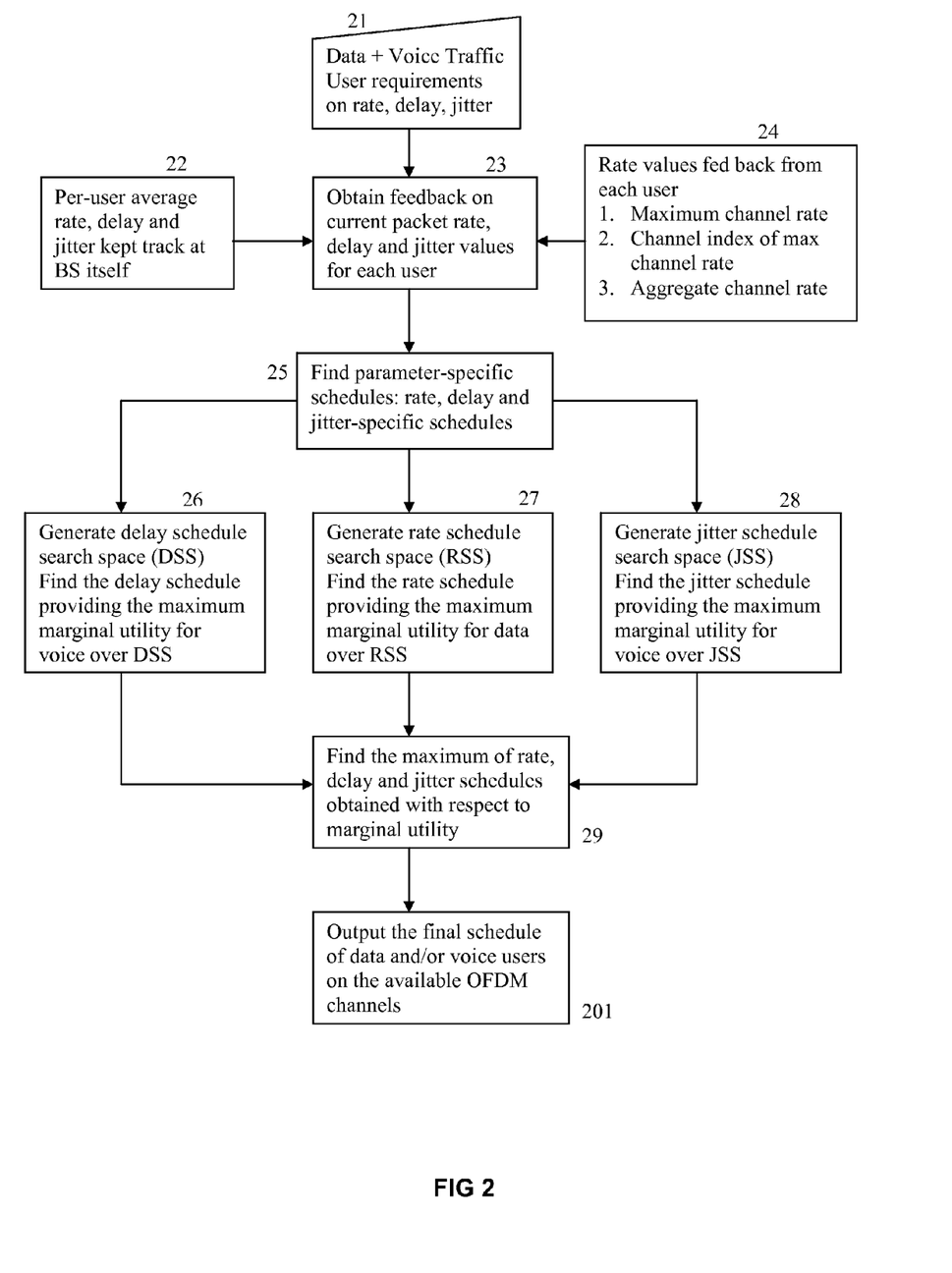
FIG. 2 is a flow diagram of the LCO scheduling process that handles data and voice traffic with rate being the parameter of interest for data, while packet delay and packet jitter being the parameters of interest for voice.

Referring now to the flow diagram of FIG. 2, the method of the inventive LCO scheduling process is shown. The inventive scheduler method handles data and voice traffic with rate being the parameter of interest for data, while packet delay and packet jitter being the parameters of interest for voice.

Step 1: Base station (BS) collects user requirements for data and voice traffic in terms of the minimum rate guarantee for data flows, and maximum tolerable delay and jitter guarantees for voice flows 21.

Step 2: BS keeps track of average user throughput/rate, packet delay and jitter for every user that it services 22. However, it needs information on the instantaneous rate, delay and jitter of the current head of line packet of each user. For rate information, every MS collects and feeds back 23 to the BS, (i) the maximum rate over all the available OFDM channels (Rmu), (ii) the channel index corresponding to the maximum rate (Imu), and (iii) the aggregate rate over all the available OFDM channels (Rsu) 24. The current packet's delay and jitter information are obtained using the packet's rate information fed back as well as information retained from the previous packet.

Step 3: BS uses the feedback to determine the potential schedule set based on the parameters considered and then determines the best schedule 25.

Step 4: If there are multiple flows for each user, then BS first determines the contending flow for each user, k, based on the aggregate rate feedback, Rsu as follows. For simplicity, assume the set of K users consists of Kv voice and Kd data users respectively.

$$f_k^* = \operatorname{argmax}_f \left\{ \alpha_f \frac{(\Delta U)_{k,f,p_d} + (\Delta U)_{k,f,p_j}}{2} \right\}, \text{ for } k \in K_v$$

$$f_k^* = \operatorname{argmax}_f \left\{ \alpha_f (\Delta U)_{k,f,p_r} \right\}, \text{ for } k \in K_d$$

Step 5: BS obtains the search space for each of the individual parameters (rate, delay and jitter) based on the identified optimizing strategies Rate schedule search space (RSS): $S_{p_r} \leftarrow$ {Set of all possible combinations of—N data users (out of Kd) with a corresponding sub-channel assignment of N channels to the N data users} 27.

Delay schedule search space (DSS): $S_{p_d} \leftarrow$ {Set of Kv voice users with all channels assigned to each user} 26.

Jitter schedule search space (JSS): $S_{p_j} \leftarrow$ {Set of all possible combinations of—N voice users (out of Kv) with a corresponding sub-channel assignment of N channels to the N data users} 28.

Step 6: BS calculates individual parameter (rate, delay and jitter) specific schedules that provide maximum incremental/marginal utility 29:

$$\Delta U_{(S_{p_r})_{max}} = \max_{S_{p_r}} \left\{ \sum_{(k,v_k) \in S_{p_r}} \beta_k \alpha_k^* \frac{r_k}{L_k P_k} U_{k,v_k}(p_r)'(\delta p_r) \right\}$$

$$\Delta U_{(S_{p_d})_{max}} = \max_{S_{p_d}} \left\{ \sum_{(k,v_k) \in S_{p_d}} \beta_k \alpha_k^* \frac{r_k}{L_k P_k} \frac{U_{k,v_k}(p_d)'(\delta p_d) + U_{k,v_k}(p_j)'(\delta p_j)}{2} \right\}$$

$$\Delta U_{(S_{p_j})_{max}} = \max_{S_{p_j}} \left\{ \sum_{(k,v_k) \in S_{p_j}} \beta_k \alpha_k^* \frac{r_k}{L_k P_k} \frac{U_{k,v_k}(p_d)'(\delta p_d) + U_{k,v_k}(p_j)'(\delta p_j)}{2} \right\}$$

$v_k$ represents the sub-channel assignment vector of length N.

Step 7: BS calculates the final schedule 201 of users on channels, as the one that provides the maximum incremental/marginal utility among the parameter-specific schedules already determined in Step 6:

$$S_{max} = \operatorname{argmax} \{ \Delta U_{(S_{p_r})_{max}}, \Delta U_{(S_{p_d})_{max}}, \Delta U_{(S_{p_j})_{max}} \}$$

Performance:

The LCO scheduling process incurs a complexity proportional to a search space of $$\left[ K_a + \binom{K_a}{A} + \binom{K_d}{A} \right]$$

which is an order of $N^N$ lesser than that incurred in the optimal scheme, namely $$\binom{KA}{A}.$$

If Br and Bn represent the number of bits allocated for rate and antenna index feedback respectively, then the feedback overhead in LCO is K(2Br+Bn), which is almost an order of N lesser than that incurred in the optimal scheme, namely KN(Br+Bn). Further, the performance of the LCO scheme is within about 20% of that of the optimal, thereby providing significant performance benefits as well. The performance gain over the conventional homogeneous scheduling approaches is several orders of magnitude (2-3 folds) better due to the inability of conventional approaches to handle heterogeneous traffic parameters in tandem.

The following list represents the essential set of features that need to be present in any efficient, practical scheduler design: (a) heterogeneous traffic types/parameters, (b) intra+inter-user scheduling, (c) flexible resource allocation between different traffic types, (d) joint scheduling and resource allocation, and (e) low complexity-overhead. However, most of the prior art works consider only one or at most two aspects in the list above in their scheduler design.

Figure 3A:
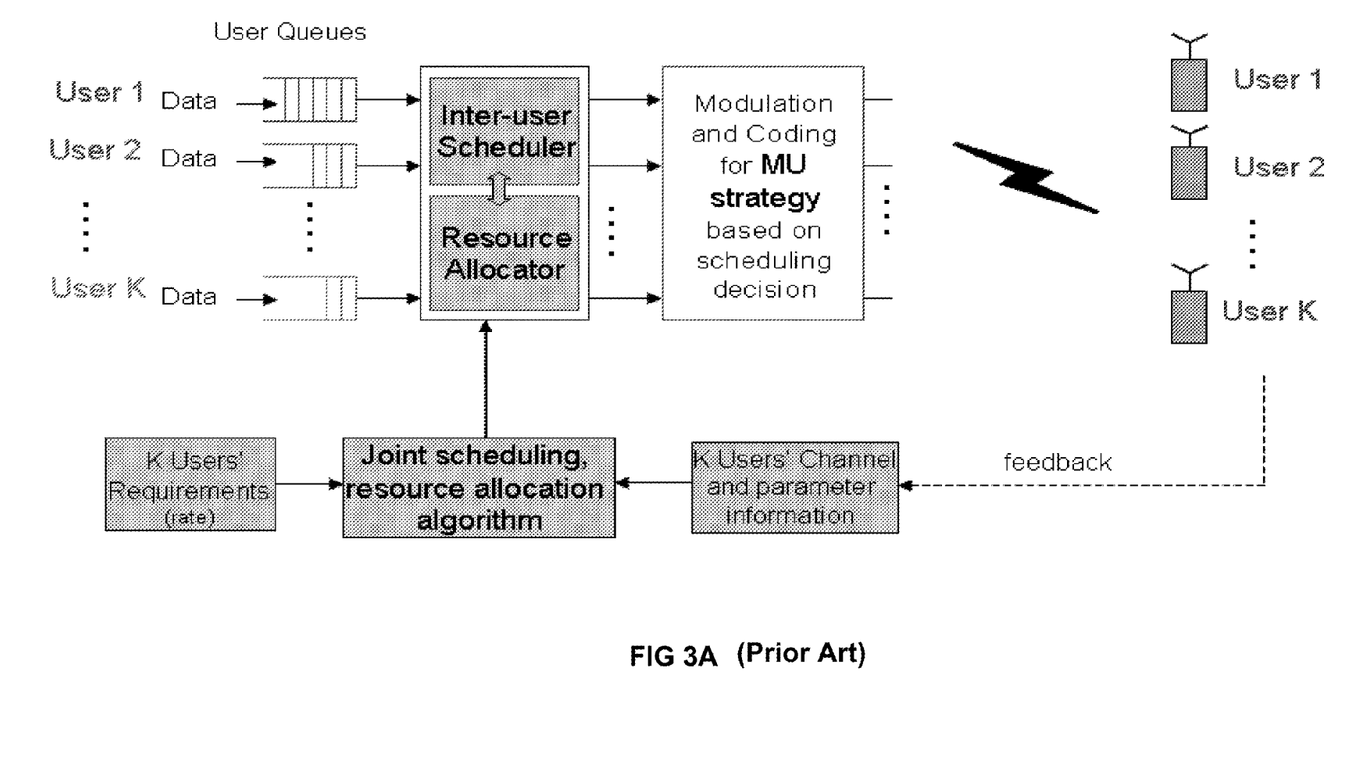
FIG. 3A is a system block diagram with conventional scheduling according to the prior art.
Figure 3B:
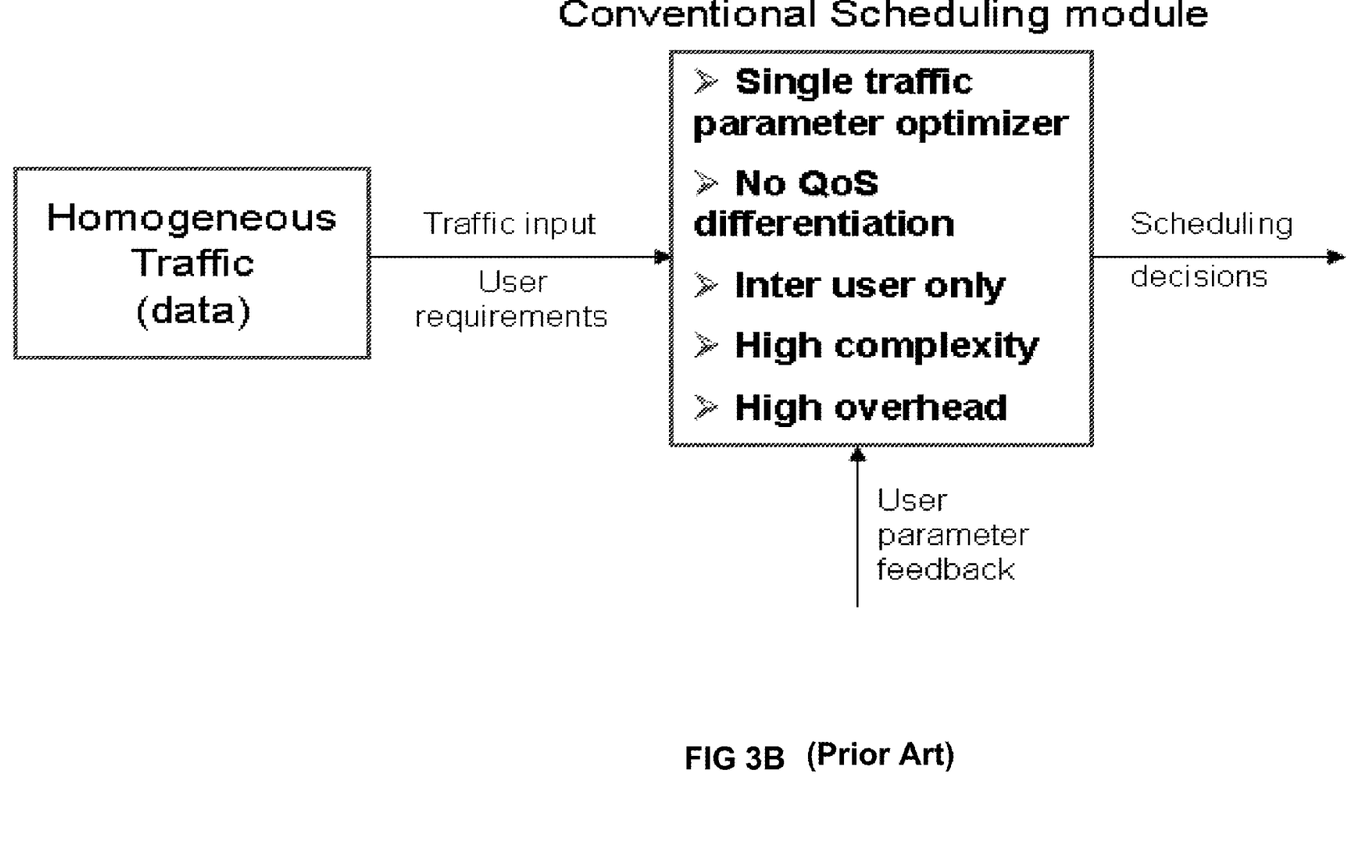
FIG. 3B is a block diagram illustrating conventional scheduling module functionalities.

As shown in the conventional system diagram in FIG. 3A, and the conventional scheduling module functionalities detailed in FIG. 3B, the main components lacking in almost all the prior art works are the (i) accommodation of heterogeneous traffic types/parameters both in intra and inter user scheduling, (ii) flexible allocation of resources between the different traffic types and accommodation of multiple traffic QoS classes, and (iii) efficient scheduling with low complexity and low overhead, which are critical for the real-time execution of the scheduling mechanisms at the base station.

The schedulers focused on homogeneous traffic types, mainly rate for data flows, suffer several orders (2-3 folds) in performance when compared to the LCO approach, due to their inability to accommodate heterogeneous traffic types/parameters in tandem and flexibly allocate resources between them. These include packet schedulers that exploit channel-dependent scheduling and OFDM resource allocation schemes. Even the optimal OFDM resource allocation suffers a performance loss of 75%, not to mention the several orders ($N^N$) of complexity required to obtain the optimal performance when compared to the LCO scheme.

The schedulers focused on heterogeneous traffic types, data and voice, are unable to flexibly allocate resources between the different traffic types and hence cannot be used in the presence of traffic quality of service QoS classes, which are essential in the Internet. Further, they also do not focus on the efficient physical layer resource allocation part and their associated complexity and overhead.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations, which although not explicitly shown or described herein, embody the principles of the invention and are within their spirit and scope.

What is claimed is:

1. A method comprising the steps of:
    tracking minimum of a rate, a maximum tolerance of a packet delay and a jitter for every user that is serviced in an OFDM cellular system;
    using feedback from said every user to determine a potential schedule set responsive to user requirements for data and voice traffic and to a guarantee of said minimum of said rate for data flows, and guarantees of said maximum tolerance of said packet delay and said jitter for voice flows;
    responsive to said potential schedule set, determining if there are multiple flows for each user, then first determining a contending flow for each user;
    obtaining search space for the user requirements of said rate, said packet delay and said jitter responsive to said contending flow for each user and responsive corresponding optimizing strategies based on at least one of heterogeneous traffic parameters, flexible quality of service differentiation, intra and inter user scheduling, low complexity and low overhead;
    determine individual schedules related to said rate, said packet delay and said jitter responsive to said search space for providing maximum incremental or marginal utility; and
    calculating final schedule of users on channels providing maximum incremental or marginal utility among said schedules responsive to said individual schedules related to said rate, said packet delay and said jitter.

2. The method of claim 1, wherein the tracking average step is responsive to instantaneous rate, delay and jitter of current head of line packet of each user.

3. The method of claim 2, wherein for rate information, every mobile station MS collects and feeds back to a base station (i) the maximum rate over all the available OFDM channels (ii) the channel index corresponding to the maximum rate, and (iii) the aggregate rate over all the available OFDM channels.

4. The method of claim 1, wherein current packet's delay and jitter information are obtained using the packet's rate information fed back as well as information retained from the previous packet.

5. The method of claim 1, wherein if there are multiple flows for each user, first determining contending flow for each user comprises determining the specific voice flow amongst all voice flows belonging to a voice user that provides the highest sum of the marginal utilities with respect to delay and jitter traffic parameters.

6. The method of claim 1, wherein if there are multiple flows for each user, first determining contending flow for each user comprises determining the specific voice flow, amongst all voice flows belonging to a voice user that provides the highest sum of the marginal utilities with respect to delay and jitter traffic parameters, term within parentheses on right hand side in accordance with the following relationship $$f_k^* = \mathrm{argmax}_f \left\{ \alpha_f \frac{(\Delta U)_{k,f,p_d} + (\Delta U)_{k,f,p_j}}{2} \right\}, \text{ for } k \in Kv,$$

where U is a utility function, f is a flow index, k is a user index, $\alpha$ is traffic type priority, p is parameter (rate/delay/jitter) and P is number of parameters.

7. The method of claim 1, wherein if there are multiple flows for each user, first determining contending flow for each user comprises determining specific data flow, amongst all data flows belonging to a data user that provides the highest marginal utility with respect to rate traffic parameter.

8. The method of claim 1, wherein if there are multiple flows for each user, first determining contending flow for each user comprises determining specific data flow, amongst all data flows belonging to a data user that provides the highest marginal utility with respect to rate traffic parameter, term within parentheses on right hand side in accordance with the following relationship $f_k^* = \mathrm{argmax}_f\{\alpha_f(\Delta U)_{k,f,p_r}\}$, for $k \in Kd$, where U is a function, f is a flow index, k is a user index, a is traffic type priority, p is parameter (rate/delay/jitter) and P is number of parameters.

9. The method, of claim 1, wherein the multiple flows for each user, given the set of K users consists of Kv voice and Kd data users respectively and the following relationship holds, $$f_k^* = \mathrm{argmax}_f \left\{ \alpha_f \frac{(\Delta U)_{k,f,p_d} + (\Delta U)_{k,f,p_j}}{2} \right\}, \text{ for } k \in Kv$$

$$f_k^* = \mathrm{argmax}_f \left\{ \alpha_f (\Delta U)_{k,f,p_r} \right\}, \text{ for } k \in Kd,$$

where U is a utility function, f is a flow index, k is a user index, $\alpha$ is traffic type priority, p is parameter (rate/delay/jitter), and P is number of parameters.

10. The method of claim 1, wherein the step of determining individual schedules related to said rate, said packet delay and said jitter comprises the relationships $$\Delta U_{(S_{p_r})_{max}} = \max_{S_{p_r}} \left\{ \sum_{(k,v_k) \in S_{p_r}} \beta_k \alpha_k^* \frac{r_k}{L_k P_k} U_{k,v_k}(p_r)'(\delta p_r) \right\}$$

$$\Delta U_{(S_{p_d})_{max}} = \max_{S_{p_d}} \left\{ \sum_{(k,v_k) \in S_{p_d}} \beta_k \alpha_k^* \frac{r_k}{L_k P_k} \frac{U_{k,v_k}(p_d)'(\delta p_d) + U_{k,v_k}(p_j)'(\delta p_j)}{2} \right\}$$

$$\Delta U_{(S_{p_j})_{max}} = \max_{S_{p_j}} \left\{ \sum_{(k,v_k) \in S_{p_j}} \beta_k \alpha_k^* \frac{r_k}{L_k P_k} \frac{U_{k,v_k}(p_d)'(\delta p_d) + U_{k,v_k}(p_j)'(\delta p_j)}{2} \right\}$$

where U is a utility function, f is a flow index, k is a user index, $\alpha$ is a traffic type priority, $\beta$ is a user QoS class priority, p is a parameter (rate/delay/jitter), r is a instantaneous rate, L is a packet size, P is a number of parameters, S is a potential schedule search space and $v_k$ represents the sub-channel assignment vector of length N.

11. The method of claim 10, wherein the step of calculating final schedule of users on channels providing maximum incremental or marginal utility among said schedules form the determining step is accomplished in accordance with the relationship $S_{max} = \arg\max\{\Delta U_{(S_{pr})_{max}}, \Delta U_{(S_{pd})_{max}}, \Delta U_{(S_{pj})_{max}}\}$.

12. The method of claim 10, wherein the step of calculating final schedule of users on channels providing maximum incremental or marginal utility among said schedules is accomplished in accordance with the relationship $S_{max} = \arg\max\{\Delta U_{(S_{pr})_{max}}, \Delta U_{(S_{pd})_{max}}, \Delta U_{(S_{pj})_{max}}\}$, the relationship taking the rate, delay and jitter specific schedules that provide the highest marginal utility with respect to rate, delay and jitter parameters respectively and finding the one that provides the highest marginal utility among the three, that schedule being returned as a final schedule of users along with a corresponding assignment of channels to the chosen users.

13. The method of claim 1, wherein the step of determining individual schedules related to said rate, said racket delay and said jitter comprises determining a schedule that provides the highest marginal utility with respect to the rate traffic parameter, the resulting schedule being a set of data users and an assignment of sub-channels to the data users chosen, the schedule being obtained by searching ever all possible schedules in a rate schedule search (RSS) space.

14. The method of claim 1, wherein the step of determining individual schedules related to said rate, said packet delay and said jitter comprises the relationship $$\Delta U_{(S_{pr})_{max}} = \max_{S_{pr}} \left\{ \sum_{(k,v_k) \in S_{pr}} \beta_k \alpha_k^* \frac{r_k}{L_k P_k} U_{k,v_k}(p_r)'(\delta p_r) \right\},$$

where U is a utility function, f is a flow index, k is a user index, $\alpha$ is a traffic type priority, is a user QoS class priority, p is a parameter (rate/delay/jitter), r is a instantaneous rate, L is a packet size, P is a number of parameters, S is a potential schedule search space and $v_k$ represents the sub-channel assignment vector of length N, the relationship determining a schedule that provides the highest marginal utility, term within parentheses on right hand side, with respect to the rate traffic parameter, the resulting schedule being a set of data users and an assignment of sub-channels to the data users chosen and the schedule being obtained by searching over all possible schedules in a rate schedule search (RSS) space.

15. The method of claim 1, wherein the step of determining individual schedules related to said rate, said packet delay and said jitter comprises determining a schedule that provides the highest sum of marginal utilities with respect to delay and jitter traffic parameters, the schedule obtained being a set of voice users and an assignment of sub-channels to the voice users chosen, the schedule being obtained by searching over all possible schedules in a delay schedule search (DSS) space.

16. The method of claim 1, wherein the step of determining individual schedules related to said rate, said packet delay and said jitter comprises the relationship $$\Delta U_{(S_{pd})_{max}} = \max_{S_{pd}} \left\{ \sum_{(k,v_k) \in S_{pd}} \beta_k \alpha_k^* \frac{r_k}{L_k P_k} \frac{U_{k,v_k}(p_d)'(\delta p_d) + U_{k,v_k}(p_j)'(\delta p_j)}{2} \right\},$$

where U is a utility function, f is a flow index, k is a user index, $\alpha$ is a traffic type priority, $\beta$ is a user QoS class priority, p is a parameter (rate/delay/jitter), r is a instantaneous rate, L is a packet size, P is a number of parameters, S is a potential schedule search space and $v_k$ represents the sub-channel assignment vector of length N, the relationship determining a schedule that provides the highest sum of marginal utilities, term within parentheses on right hand side, with respect to delay and jitter traffic parameters, the obtained schedule being a set of voice users and an assignment of sub-channels to the voice users chosen, the schedule being obtained by searching over all possible schedules in the delay schedule search (DSS) space.

17. The method of claim 1, wherein the step of determining individual rate, delay and jitter related schedules providing maximum incremental or marginal utility comprises the relationship $$\Delta U_{(S_{pj})_{max}} = \max_{S_{pj}} \left\{ \sum_{(k,v_k) \in S_{pj}} \beta_k \alpha_k^* \frac{r_k}{L_k P_k} \frac{U_{k,v_k}(p_d)'(\delta p_d) + U_{k,v_k}(p_j)'(\delta p_j)}{2} \right\}$$

where U is a utility function, f is a flow index, k is a user index, $\alpha$ is a traffic type priority, $\beta$ is user QoS class priority, p is a parameter (rate/delay/jitter), r is a instantaneous rate, L is a packet size, P is a number of parameters, S is a potential schedule search space and $v_k$ represents the sub-channel assignment vector of length N, the relationship determining a schedule that provides the highest sum of marginal utilities, term within parentheses on right hand side, with respect to delay and jitter traffic parameters, the obtained schedule being a set of voice users and an assignment of sub-channels to the voice users chosen, the schedule being obtained by searching over all possible schedules in the jitter schedule search (JSS) space.

18. The method of claim 1, wherein the step obtaining search space for the user requirements of rate, delay and jitter responsive to corresponding optimizing strategies comprises the relationships according to rate schedule search space (RSS): $S_{pr} \leftarrow$ {Set of all possible combinations of—N data users (out of Kd) with a corresponding sub-channel assignment of N channels to the N data users}, delay schedule search space (DSS) $S_{pd} \leftarrow$ {Set of Kv voice users with all channels assigned to each user}, and jitter schedule search space (JSS): $S_{pj} \leftarrow$ {Set of all possible combinations of—N voice users (out of Kv) with a corresponding sub-channel assignment of N channels to the N data users}.

19. An apparatus comprising: An apparatus comprising:
means for tracking minimum of a rate, a maximum tolerance of a packet delay and jitter for every user that is serviced in an OFDM cellular system;
means for using feedback from said every user to determine a potential schedule set responsive to user requirements for data and voice traffic and to a guarantee of said minimum of said rate for data flows, and guarantees of said maximum tolerance of said packet delay and said jitter for voice flows;
responsive to said potential schedule set determining if there are multiple flows for each user, said means for using feedback includes first determining a contending flow for each user;
means for obtaining search space for the user requirements of said rate, said packet delay and said jitter responsive to corresponding optimizing strategies based on at least one of heterogeneous traffic parameters, flexible quality of service differentiation, intra and inter user scheduling, low complexity and low overhead;

means for determining individual schedules related to said rate, said packet delay and said jitter, responsive to said search space for providing maximum incremental or marginal utility; and means for calculating final schedule of users on channels providing maximum incremental or marginal utility among said schedules responsive to said individual schedules related to said rate, said packet delay and said jitter.

20. The apparatus of claim 19, wherein the first determining contending flow for each user comprises given the set of K users consists of Kv voice and Kd data users respectively, the following relationship holds:

$$f_k^* = \mathrm{argmax}_f \left\{ \alpha_f \frac{(\Delta U)_{k,f,p_d} + (\Delta U)_{k,f,p_j}}{2} \right\}, \text{ for } k \in K_v$$

$$f_k^* = \mathrm{argmax}_f \left\{ \alpha_f (\Delta U)_{k,f,p_r} \right\}, \text{ for } k \in K_d,$$

where U is a utility function, f is a flow index, k is a user index, $\alpha$ is traffic type priority, p is parameter (rate/delay/jitter) and P is number of parameters.

21. The apparatus of claim 19, wherein the means for determining individual schedules related to said rate, said packet delay and said jitter comprises the relationships $$\Delta U_{(S_{p_r})_{max}} = \mathrm{max}_{S_{p_r}} \left\{ \sum_{(k,v_k) \in S_{p_r}} \beta_k \alpha_k^* \frac{r_k}{L_k P_k} U_{k,v_k}(p_r)'(\delta p_r) \right\}$$

$$\Delta U_{(S_{p_d})_{max}} = \mathrm{max}_{S_{p_d}} \left\{ \sum_{(k,v_k) \in S_{p_d}} \beta_k \alpha_k^* \frac{r_k}{L_k P_k} \frac{U_{k,v_k}(p_d)'(\delta p_d) + U_{k,v_k}(p_j)'(\delta p_j)}{2} \right\}$$

$$\Delta U_{(S_{p_j})_{max}} = \mathrm{max}_{S_{p_j}} \left\{ \sum_{(k,v_k) \in S_{p_j}} \beta_k \alpha_k^* \frac{r_k}{L_k P_k} \frac{U_{k,v_k}(p_d)'(\delta p_d) + U_{k,v_k}(p_j)'(\delta p_j)}{2} \right\}$$

where U is a utility function, f is a flow index, k is a user index, $\alpha$ is a traffic type priority, $\beta$ is a user QoS class priority, p a parameter (rate/delay/jitter), r is a instantaneous rate, L is a packet size, P is a number of parameters, S is a potential schedule search space and $v_k$ represents the sub-channel assignment vector of length N.

22. The apparatus of claim 21, wherein the means for calculating final schedule of users on channels providing maximum incremental or marginal utility among said schedules is accomplished in accordance with the relationship $S_{max} = \mathrm{argmax} \{ \Delta U_{(S_{pr})_{max}}, \Delta U_{(S_{pd})_{max}}, \Delta U_{(S_{pj})_{max}} \}$.

* * * * *